United States Patent [19]

Schulze et al.

[11] 4,304,690

[45] Dec. 8, 1981

[54] COMPOUNDS FROM AMINATED ALKOXYLATED ALIPHATIC ALCOHOL

[75] Inventors: Heinz Schulze; Robert L. Zimmerman; Carter G. Naylor, all of Austin, Tex.

[73] Assignee: Texaco Development Corp., White Plains, N.Y.

[21] Appl. No.: 148,429

[22] Filed: May 9, 1980

Related U.S. Application Data

[62] Division of Ser. No. 26,270, Apr. 2, 1979, Pat. No. 4,235,811.

[51] Int. Cl.$^3$ .................. C11D 3/066; C11D 1/18
[52] U.S. Cl. .................... 252/526; 252/524; 252/542; 252/545; 260/513 N; 260/326.45; 260/501.11; 260/501.12
[58] Field of Search ............... 252/542, 545, 524, 526; 260/326.45, 513 N, 501.11, 501.12

[56] References Cited

U.S. PATENT DOCUMENTS

| | | | |
|---|---|---|---|
| 2,757,125 | 7/1956 | Mudrak | 260/326.45 |
| 3,084,187 | 4/1963 | Gaertner | 260/513 N |
| 3,210,410 | 10/1965 | Gaertner | 260/513 N X |
| 3,417,136 | 12/1968 | Hovden | 260/501.11 X |
| 3,449,430 | 6/1969 | Dohr et al. | 252/547 X |
| 4,107,096 | 8/1978 | McEntire et al. | 260/501.11 |
| 4,235,811 | 11/1980 | Schulze et al. | 252/530 X |

Primary Examiner—Mayer Weinblatt
Attorney, Agent, or Firm—Carl G. Ries; Robert A. Kulason; Kenneth R. Priem

[57] ABSTRACT

Novel compounds are produced from aminated alkoxylated aliphatic alcohols and alkyl phenols are described. The compound is formed by reacting the nitrogen atom with certain compounds to form hydroxyl, carboxyl or sulfonate terminated compounds susceptible to salt formation with Group 1a and 2a metals, particularly sodium and potassium, to increase the water solubility of the compound. These compounds, particularly the salts of these compounds, are useful surface active agents and are soluble in polar and non-polar solvents. They are useful as oil and fuel additives, anticorrosive agents, detergents, froth flotation and oil recovery chemicals, and certain metal salts of the compound are useful as isocyanurate catalysts.

4 Claims, No Drawings

COMPOUNDS FROM AMINATED ALKOXYLATED ALIPHATIC ALCOHOL

This application is a division of Application Ser. No. 026,270 filed Apr. 2, 1979, now U.S. Pat. No. 4,235,811.

I. BACKGROUND OF THE INVENTION

1. Field of the Invention

This invention relates generally to the field of novel organic chemical compounds useful generally as surfactants and more particularly certain species useful as surface active agents for detergent preparation and catalysts for the preparation of isocyanurate foams.

2. Description of the Prior Art

Ethoxylated alcohols and alkyl phenols are well known for their use as non-ionic surface active agents with the hydroxyethoxy groups providing the hydrophilic portion of the molecule. The manufacture of these materials is well well known from the patent literature by the reaction of ethylene oxide with aliphatic alcohols or the phenolic hydroxyl group of an alkyl phenol. If propylene oxide is substituted for any, or all, of the ethylene oxide, then the compound becomes less water soluble and more oil soluble.

Hydroxyl terminated compounds may be converted into primary amines by several methods. One such method is to prepare an amine from a hydroxyl terminated polyoxyalkylene aliphatic compound is through the reductive amination of the hydroxyl group by reacting ammonia with the hydroxyl terminated compound, usually in the presence of hydrogen, and a catalyst. While a number of catalysts are well known, the catalyst described in U.S. Pat. No. 3,152,998, for example, and the method described in U.S. Pat. Nos. 3,644,370 and 3,390,184 particularly describe this preparation of primary amines.

Another method for the preparation of such primary amines is to react the hydroxyl containing compound with alkenyl nitriles, such as acrylonitrile in the presence of gaseous ammonia to form a 3-alkoxypropiononitrile as described, for example, in U.K. Pat. No. 869,405. The nitrile group is then catalytically reduced, in the presence of hydrogen, to form the primary amine compound.

The acrylonitrile reaction can be employed either directly to the aliphatic alcohol or to the hydroxyl group of an alkoxylated alcohol or alkyl phenol.

Certain of these compounds are useful in the preparation of the compounds of this invention through the reaction of the primary amino group with various other compounds which provide the overall molecule with reactive groups for improved water solubility. Thus, the oil solubility of prior art surface active compounds can be improved by the addition of propylene oxide to the aliphatic alcohol or alkyl phenol; and the water solubility improved by the conversion of the compound of this invention to the salts of the light metals of Group 1a or 2a on the Periodic Chart, particularly the sodium and potassium salts of the compounds of this invention. Surprisingly, it has been discovered that these compounds do not possess the prior art detriment of being precipitated by the presence of calcium ions from calcium salts in the water. The presence of calcium ions in the water have been found to be the downfall of many prior art surface active agents.

The primary amino terminated compounds used as the precursor of this invention are reacted with dibasic acids, most particularly their anhydrides, and other compounds to form the compounds of this invention. While the reactions of a number of the substituents added to prepare the compounds of this invention with primary amines is well documented in the prior art; none of the prior art recognizes the reaction of these compounds with the precursors used to form the novel compounds of this invention. For example, U.S. Pat. No. 2,757,125 teaches the reaction of itaconic acid with dodecyl amine. While the sodium salt of this material, a white powder, had good foaming properties in an aqueous solution, the calcium salt was insoluble in water. It will be shown that the compounds of this invention do not suffer from such an infirmity.

Further, other itaconic acid and amine reaction products have been found to be anticorrosive agents for metals and lube oil additives, as described in U.S. Pat. Nos. 3,224,968 and 3,224,975. Again, the reaction was with a straight chain alkyl amine or fatty acid amine. The reaction of tetrapropenylsuccinic anhydride with an amine such as triphenyl amine has been described as useful in preparing a lubricating oil additive in German Offen. No. 2,447,550; the epoxidation of a 2-alkyl amine is described in German Offen. No. 2,429,791 for the formation of corrosion inhibiting amine emulsions; and other corrosion inhibiting compounds are described in U.S. Pat. No. 2,604,451 wherein the reaction of an amine is with an alpha-substituted dicarboxylic acid or acid anhydride such as alkenylsuccinic acids and phenoxyphenylalkylsuccinic acids is described.

Still, another copious prior art describing related reactions and related problems is available, the solution discovered by applicants has not manifested itself. This is particularly true with respect to the calcium salt solubility and the discovery that pyrrolidinone compounds of this invention, when existing as the Group 1a and 2a metal salts, are outstanding catalysts for the production of isocyanurate foams as will be more particularly described herein.

SUMMARY OF THE INVENTION

The compounds of this invention are represented by the formula:

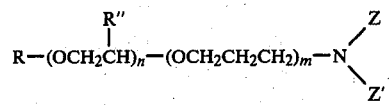

with R, R″, n and m being defined as set forth hereinafter. In the compounds of this invention, Z is hydrogen or —(CH$_2$CH$_2$O)$_p$—H, where p has an average value of from 1 to about 6, and Z' is —(CH$_2$CH$_2$O)$_p$—H where p is as previously defined. Also, Z may be

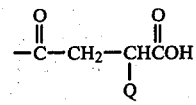

where Q is hydrogen or a C$_1$ to about C$_{14}$ alkyl or alkenyl group; or

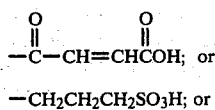

—CH$_2$CH$_2$CH$_2$SO$_3$H; or

-continued

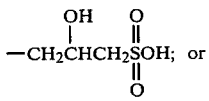

Z and $Z^1$, taken together, is

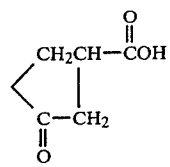

When formed into the salt of a Group 1a or 2a metal, particularly the sodium, potassium and calcium salts thereof, these compounds exhibit improved water solubility, even in the presence of calcium salts and perform admirably as surface active agents in detergent formulations, froth flotation and oil cleaning chemicals, and the sodium salt of the pyrrolidinone as a catalyst for the isocyanurate reaction.

The basic reactions used to form the compounds of this invention are well known. Basically, it involves the alkoxylation, preferably propoxylation of an aliphatic alcohol or alkyl phenol initiator, to form a hydroxyl terminated compound which then can be subjected to reaction with ammonia in the presence of a catalyst and hydrogen to form a primary amine. Alternatively, the aliphatic alcohol or alkyl phenol or even an alkoxylated alcohol or alkyl phenol can be reacted with acrylonitrile followed by the hydrogenation of the nitrile group to form the primary amine. To form the compounds of this invention, this amine is then reacted with dibasic acids or acid anhydrides, ethylene oxide, cyclic propanesulfonates in order to form the basis for improved water solubility of the compound as a whole. While the addition of ethylene oxide itself improves such water solubility, the conversion of free carboxyl or sulfonate groups to salts of the Group 1a or 2a light metals greatly improves the water solubility of these compounds.

DETAILED DESCRIPTION OF THE INVENTION

The novel compounds of this invention, as set forth above are represented by the formula:

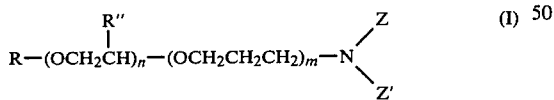

where R is an alkyl group having an average of from 6 to about 18 carbon atoms, preferably an average of from about 8 to about 14 carbon atoms, or an alkyl phenol where the alkyl group contains an average of from about 6 to about 12 carbon atoms. These materials are derived from aliphatic alcohols, in the case where R is an alkyl group, and preferably these alcohols are the result of the polymerization of ethylene to form a mixture of straight chain alcohols having even numbered carbon atoms, usually the mixture contains from $C_{10}$ through $C_{14}$ alcohols or in some instances, mixtures of $C_{10}$ and $C_{12}$ aliphatic alcohols. Even though mixtures of such aliphatic alcohols are preferred, within the carbon chain lengths set forth above, it is contemplated to be within the scope of this invention to utilize pure aliphatic alcohols having either straight or branched chains. When alkylphenols are alkoxylated, the alkyl group would preferably contain from about 6 to about 12 carbon atoms attached to the phenyl moiety of the phenol. Again, it is contemplated that mixtures of such alkyl phenyl compounds or even a mixture of alkyl phenyl initiators with aliphatic alcohols can be used to make compounds of this invention.

The alcohol or alkyl phenol having primary hydroxyl groups is reacted with an alkylene oxide or mixture of alkylene oxides represented by the formula:

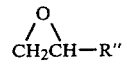

where R" is either hydrogen or a methyl group showing that either ethylene oxide, propylene oxide, or heteric or blocked mixtures thereof, can be used to form he alkoxylate part of the molecule. The subscript n, in formula (I), has an average value of from zero to about twenty. When the value of n is zero, the alcohol or alkyl-phenol is reacted with acrylonitrile using known methods as hereinbefore mentioned. It is preferable that from about 2 to about 15 moles of alkylene oxide, most preferably propylene oxide, is reacted with the initiator to form a chain of repeating ether linkages. The reaction of an alkylene oxide with hydroxyl groups is well known and the reaction conditions are as described in U.S. Pat. No. 3,535,307, one of many patents which describe such reaction conditions. These prior art reaction conditions are incorporated herein by reference. This patent, as well as U.S. Pat. No. 3,000,963, describes the preparation of blocked oxide addition but the general procedures are well documented in the art.

Having obtained a polyoxyalkylated adduct of the alkylene oxide and aliphatic alcohol, or alkyl-phenol, the hydroxyl group is then to be replaced by a primary amino group. This is readily accomplished by the reaction of the hydroxyl-terminated compound with ammonia in the presence of a hydrogenation-dehydrogenation catalyst at elevated temperatures and pressure in the presence of hydrogen. Suitable reactors for this step include either a closed autoclave resulting in a batch process or a tubular reactor which can be operated in a continuous manner.

The class of catalysts for the amination of the hydroxyl group is well known and described in, for example, U.S. Pat. Nos. 3,847,992, 3,654,370, and 3,390,184 which also, for example, describe the operating conditions for the aminolysis of the hydroxyl group. The class of catalysts is well known and includes one or more of the metals including copper, nickel, cobalt, chromium, aluminum, manganese, platinum, pladium and rodiaum and the oxides of these metals. The metals and their oxides may be employed in combination with normally non-reducible metal oxides such as chromium oxide, molydenum oxide and manganese oxide. The amount of non-reducible oxide employed may vary considerably in some catalysts, notably those based upon cobalt, require the presence of no non-reducible oxides.

One preferred catalyst that is very effective for the amination reaction, includes the metals or oxides of copper, nickel, cobalt and chromium. A particularly satisfactory catalyst is one in which the active ingredients consist essentially, in mole percent, on an oxide free basis, of 60–85% nickel, 14–37% copper, and 1–5% chromium and is produced in accordance with the procedure described in U.S. Pat. No. 3,152,998. The reaction is generally carried out from 160°–250° C. The reaction pressures are from 750 to about 4,000 psig with a hydrogen partial pressure of at least about 200 psig. The preferred pressure range is from about 1,000 to about 2500 psig and a hydrogen partial pressure of from about 200 to about 2,000 psig. The reaction is allowed to proceed for a sufficient time to achieve substantially complete amination usually from about one to about seven hours.

As stated hereinabove, the amine termination can be achieved by the reaction of acrylonitrile, or other nitriles, to the alcohol, alkyl-phenol or the alkoxylated alcohol or alkyl-phenol. The acrylonitrile is condensed with the alcohol in any of the known procedures, particularly as described in British Pat. No. 869,405 where the nitrile and the alcohol are reacted in the presence of Raney Ni in a stirred autoclave under eight atmospheres ammonia pressure at 150° C. The contents of the reactor are then hydrogenated at 200 atmospheres of hydrogen at about 119° C. to achieve reduction of the nitrile group as well as the condensation with the hydroxyl group. It is to be understood that the conversion of hydroxyl groups to amine group is well known and not within the scope of this invention whether accomplished by the aforementioned direct reductive amination or by the nitrile reaction and reduction. Any suitable method for accomplishing this is satisfactory.

For ease in the further discussion of this invention the aforementioned aminated alkoxylated alcohol will be referred to as the initiator compound for the compounds of this invention.

Preparation Of The Compounds

The primary amino group of the initiator compound is caused to react with certain materials in order to produce the novel compounds of this invention. The resulting compound is defined as above wherein Z is hydrogen or —(CH$_2$CH$_2$O)$_p$—H where p has an average value of from 1 to about 6 and Z' is —(CH$_2$CH$_2$O)-$_p$—H where p has an average value of from 1 to about 6; or Z' is represented by the formula:

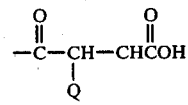

This represents the moiety formed by the reaction of the initiator compound with alkyl or alkenyl substituted succinic acid or acid anhydrides, with preferred such compounds being dodecenylsuccinic anhydride or methylenesuccinic acid; itaconic acid, which forms a cyclic pyrrolidinone, which, we have discovered, is an outstanding catalyst for the isocyanurate foam production. Generically, succinic acids having from C$_1$ to about C$_{14}$ alkyl or alkenyl groups (Q) have been found to be useful. Further, the reaction of maleic anhydride with the initiator compound, as well as propane sultone, or 3-chloro-2-hydroxypropane sulfonate produce compounds within the scope of this invention.

It is to be noted from the discussion above that in each instance an active group, usually an acidic moiety, remains for increasing the water solubility. In the instance of the addition of ethylene oxide it is the hydroxyl group which increases water solubility without further treatment. With respect to the other compounds free acidic groups, in the form of carboxyl or sulfonate groups, are available for the formation of polar water-solubility increasing groups through the addition of a Group 1a or 2a light metal, particularly sodium and potassium, to form a salt.

The basic reactions performed, and the parameters of temperature and pressure used, are well known and described in the previously stated literature. Generally, the reaction, particularly the reaction of an alkenyl succinic anhydride with the initiator compound is carried out on a mole-per-mole basis at a temperature below about 95° C. Detergents and corrosion inhibiting motor fuel compositions are described in U.S. Pat. No. 3,905,781 wherein such anhydrides are reacted with tallow amines and other aliphatic amines.

To better demonstrate the production of the compounds of this invention and to better explain the applicability thereof to various advantages to which it may be put, the following examples are offered by way of illustration and not limitation upon the invention described herein.

EXAMPLE 1

In a one-liter stainless steel stirred autoclave was placed a primary polyoxyalkylene amine represented by the formula:

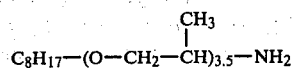

(aminated 3.5 mole propylene oxide adduct of octyl alcohol) (402.5 gms, 1.5 mol, 3.16 meq/g total acetylatables 2.99 meq/g total amine). The autoclave was flushed with nitrogen, and ethylene oxide (165 gms, 3.3 mol) added over a period of 45 minutes at 170° C. The mixture was digested 10 hours at 170° C. Final pressure at 170° C. was 60 psi. Supercell Filter Aid (5 gms) was added and the reaction product filtered and stripped at 150° C. under 0.1 mm Hg pressure. A liquid residue remained (489 gms) which was soluble in n-heptane, dispersible in water and which formed a clear, foaming aqueous solution after acidification with acetic acid. Acetic acid was added to lower the pH of the solution to about 5.5 for skin acceptability and to clarify the solution. Surface tension was 33.2 dynes/cm at 25° C. in a 0.1% aqueous solution acidified with acetic acid. The following structures were determined by nuclear magnetic responses (NMR) and infrared spectroscopy (IR) to be present:

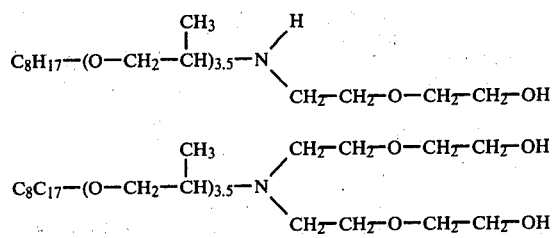

EXAMPLE 2

Maleic anhydride (103 gms, 1.05 mols) was dissolved in ethyl acetate (400 ml). The polyoxyalkylene amine of Example 1 (334 gms, 1.0 mols) was added over a period of 50 minutes at a maximum temperature of about 5° C. The reaction mixture was stirred for 30 minutes at ambient temperature and pressure and then stripped at 104° C./1.8 mm Hg. The residue (433 gms) produced was a water-insoluble viscous liquid (2.34 meq/g acid) which dissolved in water after neutralization with dilute sodium hydroxide. Surface tension at 25° C. was 33.4 dynes/cm in a 0.1% by weight aqueous solution of the sodium salt. The following structure was identified in the residue by NMR and IR analysis:

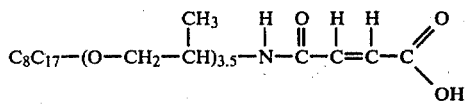

Addition of the sodium hydroxide caused the acid to become water soluble, through the formation of the sodium carboxylate, thus demonstrating the water, and thus polar, solubility of an N-substituted lipophilic polyoxypropylene amine where Z is $-COO^-Na^+$:

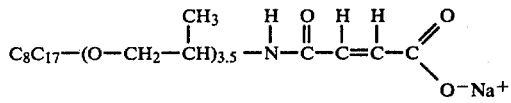

EXAMPLE 3

Into a closed stirred autoclave under a nitrogen blanket containing the amine of Example 1 (167.3 gms, 0.5 mol), was added dodecenylsuccinic anhydride (135 gms, 0.5 mols) over a period of 20 minutes. During the anhydride addition, the temperature of the mixture rose to 68° C. under autogenous pressure. Toluene (100 ml) was added and water removed by azeotropic distillation (6.9 grams $H_2O$). The toluene solution was stripped at 110° C. and 24 mm Hg and the residue hydrolyzed by boiling with sodium hydroxide (20 gms, 0.5 mol) in water (50 ml). A clear reddish brown solution resulted from the hydrolysis of:

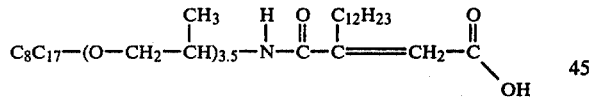

A 0.1% (wt) neutralized aqueous solution foamed on shaking. Foam was not affected nor did precipitation occur on addition of dilute calcium chloride solution. Surface tension at 25° C. was 31.3 dynes/cm thus demonstrating continued solubility in the presence of calcium ions.

EXAMPLE 4

A polyoxyalkylene amine (165 gms, 0.15 mols, 0.91 meq/g total amine) represented by the formula:

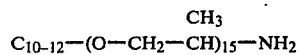

was added to a closed stirred autoclave. The amine was an aminated 15 mol propoxylated adduct of EPAL TM 10-12, a mixture of $C_{10}$ and $C_{12}$ aliphatic alcohols sold by Ethyl Corporation (hydroxyl number of 346, and analysis through gas-liquid chromatography of 71.4 mol percent $C_{10}$, 18.8 mol percent branched $C_{12}$ and 8.3 mol percent n—$C_{12}$ alcohols). The amine was added to 0.16 moles (19.5 gms) of propane sultone in the autoclave. They were mixed with stirring and, within 30 minutes, the temperature rose to 38° C. and the mixture became very viscous. Reaction was completed by digesting the product for 40 minutes at 80° C. The reaction product was neutralized by addition of dilute aqueous sodium hydroxide and the compound represented by the following structure resulted:

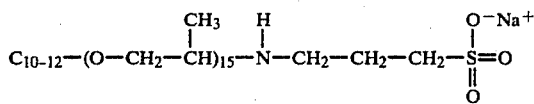

Foaming of an aqueous solution was not affected by presence of added calcium chloride.

EXAMPLE 5

The mixture of the polyoxyalkyene amine described in Example 1 (169 gms, 0.5 mols, 2.96 meq/g total amine), water (100 ml), and itaconic acid (65.5 gms, 0.5 mols) was heated 23 hours at reflux conditions. The reaction mixture was stripped in a rotary evaporator at 98° C. and 0.7 mm Hg. The residue (228 gms) was a clear viscous liquid identified as being represented by the following structure:

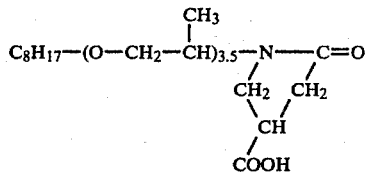

EXAMPLE 6

As in Example 5, the polyoxyalkylene amine of Example 4 (220 gms, 0.2 mols) and itaconic acid (25 gms, 0.2 mol) were heated 20 hours at 120°-150° C. to produce the compound represented by the following formula:

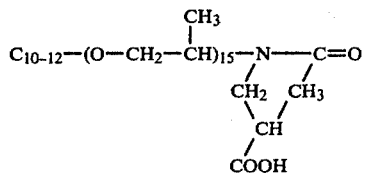

The reaction product was stripped at 100° C. and 0.7 mm Hg and an acid number of 42.3 was determined. The product was neutralized with aqueous sodium hydroxide to give a hazy solution.

EXAMPLE 7

An amine having the following formula:

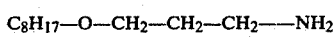

was prepared from n-octyl alcohol and acrylonitrile according to the method described in United Kingdom Pat. No. 869,405. This amine, toluene (100 ml) and itaconic acid (97.6 gms, 0.75 mols) were stirred and heated 17 hours at 97° C., followed by heating at reflux conditions until azeotropic water separation ceased. The residue was filtered with Supercell Filter Aid (5 gms) stripped at 114° C./0.1 mm Hg. A solid yellow residue resulted (206.5 gms) and was identified as being represented by the structure:

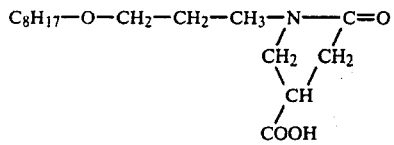

The product gave a foaming aqueous solution after neutralization with a sodium carbonate. The foam was not affected by addition of a $CaCl_2$ solution and no precipitation occurred. Analysis of the amine before neutralization showed 3.26 meq/g acid.

EXAMPLE 8

In a three-neck flask provided with stirrer, thermometer and reflux condenser with bubble counter were placed
Amine of Example 1 (167.5 g 0.5 mol)
Isopropanol (200 ml)
Water (50 ml)
Sodium bicarbonate (50 g 0.595 mol) and
Sodium 3-chloro-2-hydroxypropane sulfonate (107 g, 0.518 mol)

The reaction mixture was heated six hours at reflux (82°) until the development of carbon dioxide had entirely ceased. After cooling, solids were filtered and the filtrate stripped in a rotary evaportor at a (final) pot temperature of 90° at aspirator vacuum. The remaining gel (263 g) was represented by the structure:

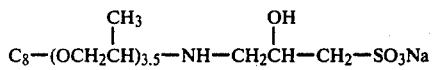

The gel was dissolved in water (375.4 g) to give a clear strongly foaming solution. Part of the above solution (16 g) was diluted with water (384 g) to give solution A. Surface tension at 25° of solution A (diluted 1:9 with water) and was 28.4 dynes/cm. Another sample of solution A (25 ml) was dilutd with saturated sodium chloride solution (25 ml) and 10% calcium chloride solution (10 ml). The diluted mixture remained clear and had a surface tension at 25° of 27.9 dynes/cm.

For comparison purposes condensation products were made of sodium 3-chloro-2-hydroxypropane sulfonate and nonylcyclohexylamine (B) and nonylphenol (C) and dissolved as above. Solutions of B and C were precipitated by the addition of saturated sodium chloride solution.

The following examples demonstrate the solubility of the above compounds of this invention when different Group 1a and 2a metal salts are produced.

EXAMPLE 9

In a two-liter flask were placed methanol (1 liter) and the acid product made according to Example 5 (300 gms, 2.28 meq/g acid) prior to neutralization. At 30° to 35° C., 30.7 gms of 91% potassium hydroxide in methanol (250 ml) was added, followed by 162 grams of triethylene glycol. The methanol was stripped at about 90° C. in a vacuum by means of rotary evaporator. The residue was liquid. A 0.1% by weight aqueous solution of the potassium salt had a surface tension of 26.7 dynes/cm at 25° C. and a pH of 6.2.

EXAMPLE 10

As in the preceding Example 8, one liter of methanol and 44.3 gms of the acid product made according to Example 5 (2.28 meq/g acid) was neutralized with sodium hydroxide (3.6 gms) in methanol, and diluted with triethylene glycol (45.8 gms). The mixture was stripped in the same manner as the preceding Example 9.

EXAMPLE 11

Seven grams of the product made according to Example 5, calcium carbonate (6.3 gms) and water (250 ml) were heated 24 hours at reflux, cooled, filtered and stripped to dryness under a vacuum. A 0.1% by weight aqueous solution of the solid residue containing 30 ppm calcium, had a surface tension of 27.9 dynes/cm at 25° C.

The corresponding n-dodecyl derivative described in U.S. Pat. No. 2,757,125 was precipitated by calcium salts. This Example demonstrates the importance of the polyoxypropylene groups prior to the nitrogen atom in the amine.

Detergent Composition Embodiment

As demonstrated above, the compounds of this invention, in the form of their Group 1a and 2a metal salts, are highly soluble in water with the alkyl or alkylphenyl polypropoxyalkylene moiety of the molecule having high oil solubility, thus imparting attractive properties for use as the surface-active component, or one of the surface-active components, in detergent compositions.

We have found that such detergent compositions can be prepared comprising from about 15 wt. % to about 30 wt. % of a surface-active agent and correspondingly from about 70 wt. % to about 85 wt. % of various well-known detergent builders, such detergent composition being dissolved in water to form a working solution. The surface-active agent of this invention as previously defined by the structural formula (I) is present at least a surface-active amount.

The preparation of detergents are well-known and the detergent is prepared by conventional well-known procedures.

In addition to the surface-active agent of this invention, other surface-active agents can be used in conjunction therewith to produce the detergent composition of this invention.

Some typical detergent builders or other additives usefully employed in practicing this invention are representatively disclosed herein. They include inorganic detergent builders, organic builders and/or chelate formers, foam stabilizers, anti-redepositon agents, hydrotropes, buffering agents, and the like. Preferably, detergent builders comprising sodium tripolyphosphate, sodium citrate, sodium carbonate, disodium oxydiacetate, or admixtures thereof, are employed in amounts sufficient to comprise about 15 to about 65 wt. % of the weight of the surface-active agent employed.

Inorganic compounds can be included in the built detergent composition to augment the detersive portion of the composition and representatively include such compounds as the alkali metal carbonates, such as potassium carbonate; borates, such as potassium tetraborate; silicates, such as sodium silicate. Phosphates, such as pyro-, poly-, meta-, or orthophosphates are suitable. Sodium pyrophosphate, and the like, is exemplary.

Organic builders and/or chelate formers can also be used with the aforestated inorganic alkaline builders and include such materials as the alkali metal salts of phytic acid; alkali metal, ammonium or substituted ammonium aminopolycarboxylate, such as sodium and potassium N-(2-hydroxyethyl)ethylenediamine triacetates, sodium and potassium nitrilotriacetates and sodium potassium and triethanolammonium-N-(2-hydroxyethyl)nitrilodiacetates. Mixed salts of these polycarboxylates are also suitable. Other valuable polycarboxylate builder compounds are the sodium and potassium salts of polymaleate, polyacrylate and polymethacrylate. Other organic builders such as the polyphosphonates such as sodium and potassium salts of ethane-1,1,1-diphosphonate, sodium and potassium salts of ethylene diphosphonate, and sodium and potassium salts of ethane-1,1,2-triphosphonate are exemplary. Alkali metal salts of ethane-2-carboxy-1,1-diphosphonic acid, hydroxymethanediphosphonic acid, carbonyl diphosphonic acid, and the like, are also representative.

Foam stabilizers can also be employed as additives such as the alkanol amides of fatty acids such as the isopropanol amide of lauric acid and the ethanol amide of lauric acid, water-soluble alkaline salts of N-alkylimino-diacetic acid, and the like.

Anti-redeposition agents and organic high-molecular colloidal substances such as water-soluble derivatives of cellulose and starch exemplified by sodium carboxymethyl cellulose are also suitable.

Various hydrotropes can be added if desired to improve the compatibility of the various ingredients employed. Hydrotropes such as benzene sulfonate, xylene sulfonate, toulene sulfonate or their salts such a ethanolammonium, diethanolammonium, and triethanolammonium and especially as the alkali metal potassium or sodium salts are suitable.

Various miscellaneous agents such as buffering agents, anticorrosion agents, water softeners, wetting agents, optical brighteners, chemical bleaching agents, resin stabilizers, dyes and pigments, germicides and antibacterial agents, and the like, as is customary, can be suitably employed.

In addition to the aforestated additives and builders that are suitable for incorporation with the sulfonated alphaolefin and sulfonated vinylidene-olefin components of this invention, various other wash-active cleaning agents can be suitable incorporated in the detergent.

EXAMPLE 12

Detergency tests of the products of Examples 4–7 were made to demonstrate the use of the metal salts of the compounds of the invention. Detergency tests were conducted at 120° F. and in 150 ppm hard water in a Terg-O-Tometer TM manufactured by U.S. Testing Company. The Terg-O-Tometer consist of a set of four small agitator washers and four 2-liter bowl containers. The speed of rotation and the angle through which the agitators can be oscillated are both adjustable. Temperature control is by means of a water bath. The agitator shifts for each of the four wash bowls are removable during operation and allow the removal of one test without disturbing the other three. A 10 minute wash cycle was used and a 5 minute rinse. Polyester-cotton cloth soiled with synthetic sebum and carbon black was used as the test cloth. The standard detergent formulation was employed as a reference which had the following composition:

(1) 20% by weight LAS TM Conoco 650 surfactant (tridecylbenzenesulfonate);
(2) 40% by weight sodium tripolyphosphate (builder added to reduce calcium precipitation);
(3) 7.0% by weight sodium metasilicate (builder added to reduce calcium precipitate);
(4) 1.0% by weight carboxymethyl cellulose (builder added as a suspension agent); and
(5) 32% by weight sodium sulfate.

The test surfactants were substituted for the LAS in the above formula. Relative detergency was determined by comparing the cleaning efficiency of the test surfactant to that of LAS at a total formulation concentration of 0.15% by weight (deviations represent 95% confidence limits):

| Product From Example | Relative Detergency |
|---|---|
| 4 | 108± 5% |
| 5 | 60 ± 12% |
| 6 | 92 ± 8% |
| 7 | 63 ± 6% |

The results indicate that the relatively long chain $C_{10}$–$C_{12}$ polyoxyalkylene amines of Example 4 and Example 6 compared favorably in detergency with the $C_{13}$ LAS detergent. The $C_3$ polyoxyalkylene amine was not quite as efficient as the longer chain LAS surfactant. The results also indicate that the $SO_3^-M^+$ water solubility increasing group is slightly better than the corresponding $CO_2^-M^+$ compound in this test.

Isocyanurate Foam Catalyst

The use of catalysts in preparing isocyanurate foams via the polymerization of a polyol, polyisocyanate and optionally other ingredients in the presence of a blowing agent is well-known. The isocyanurate group formation catalyst is used to trimerize the isocyanate groups to form the isocyanurate linkages. The polyol essentially acts as a modifying or reactive plasticizing agent in the overall polymeric scheme since a polymer containing only isocyanurate groups is itself too friable. Thus, the isocyanurate foam contains both isocyanurate groups as well as urethane linkages, with said urethane linkages acting to plasticize the foam. Initially the reaction proceeds to give primarily a urethane quasi-prepolymer containing active isocyanate groups. Subsequently, the excess isocyanate reacts to form isocyanurate groups which ultimately produces a urethane-modified polyisocyanurate polymer.

Depending upon process condition utilized, both rigid and flexible polyisocyanurate foams may be prepared as well as the semi-flexible and semi-rigid types. Some main uses of the resultant foam include those of thermal insulation, and as building materials and the like. Examples of some prior art isocyanurate foams and methods of preparation are described in U.S. Pat. Nos. 3,745,133; 3,644,232; 3,676,380; 3,168,483; and 3,519,950; 4,026,837; to name a few.

A number of prior art polyisocyanurate catalysts are known. In some instances such well-known catalysts as potassium octoate and potassium acetate catalysts are overly temperature dependent or an unduly rapid end-cure is realized in some cases with such catalysts. In other situations catalysts such as amine-type isocyanurate catalysts including amino hexahydrotriazines are unduly slow with respect to their reactivity rate resulting in a lagging end-cure. As a result, the foam so cured is not sufficiently cured in time to properly handle. The soft "green" foam coming out of the machine will have a tendency to warp if, for example, panel board is being produced.

In still further cases use of many catalysts of this type such as xanthates, dithiocarbamates or volatile amines is accompanies by an odor problem of varying severity. A suitable isocyanurate catalyst therefore should be relatively odor-free and give a relatively long cream time with quick rise and tack free times.

It would therefore be a considerable advance in the art if a new class of isocyanurate catalysts were discovered which overcomes the just discussed processing drawbacks whereby optimum foam cure rates could be achieved.

In accordance with the present invention the reaction of a polyester or polyether polyol and an aromatic polyisocyanate, in the presence of a blowing agent, to form a cellular polymer is catalyzed by compounds represented by the formula:

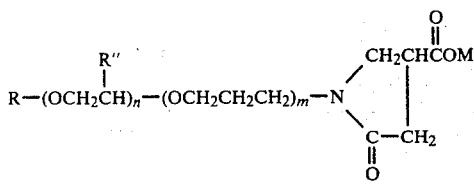

wherein R is a $C_6$ to $C_{18}$ alkyl group or a mixture thereof or an alkyl-substituted phenyl group where the alkyl group contains from 6 to about 18 carbon atoms; R" is hydrogen or methyl; n has a value of from 0 to about 20 and m has a value of 0 or 1 provided that m is one when n is zero; and M is a Group 1a or 2a metal. It is preferred that M be sodium or potassium; R is an alkyl group having an average of from about 8 to about 14 carbon atoms; R" is methyl; n has an average value of from 2 to about 15 and m is zero.

The isocyanurate foams of the present invention are prepared by mixing a polyisocyanate, a polyether or polyester polyol, an inert blowing agent and the above defined salt as an isocyanurate group formation catalyst under conventional foaming conditions utilizing conventional mixing devices employed in the manufacture of such foams. The mixing of the materials for the formulation of the reaction product is not critical to the invention. Examples of conventional polymer foam formation processes and equipment are described in Ferrigeno "Rigid Plastic Foams", Reinhold Publishing Corporation, New York, N.Y. 1963.

Any aromatic polyisocyanate may be used in the practice of the instant invention. Typical aromatic polyisocyanates include, for example, m-phenylene diisocyanate, p-phenylene diisocyanate, polymethylene polyphenylisocyanate, 2,4-tolylene diisocyanate, 2,6-tolylene diisocyanate, aliphatic-aromatic diisocyanates, such as, for example, xylylene diisocyanate, and bis(4-isocyanatophenyl)methane.

Greatly preferred aromatic polyisocyanates used in the practice of the invention are methylene-bridged polyphenyl polyisocyanate mixtures. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene bridged polyphenyl polyamines and corresponding methylene bridged polyphenyl polyisocyanates therefrom are described in the literature and in many patents, for example, U.S. Pat. Nos. 2,683,730; 2,950,263; 3,012,008; 3,444,162; and 3,352,979.

Most preferred methylene bridged polyphenyl polyisocyanate mixtures used here contain from about 20 to about 100 weight percent methylene diphenylisocyanate isomers with the remainder being polymethylene polyphenyl isocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Any conventional polyether or polyester polyol may be used in making the isocyanurate foams. Illustrative of these one can mention the following types as specifically set out, in considerable detail in the disclosure of U.S. Pat. No. 4,026,836, for example, which is incorporated herein by reference. Preferred are the polyoxyalkylene polyols such as, for example propylene glycol, ethylene glycol, diethylene glycol and other well known polyether polyols formed by the reaction of a polyhydric initiator and an alkylene oxide.

The foregoing are merely illustrative and represent only a small number of the many polyols known in the art that can be employed with the catalyst salts in the process of this invention.

The polyol or polyol mixture employed can have a hydroxyl number which can vary over a wide range. In general, the hydroxyl number of the polyols employed can range from about 20, and lower, to about 1,000, and higher, preferably from about 20 to 800, and more preferably, from 35 to about 700.

The exact polyol employed depends upon the end-use of the polyisocyanurate foam. The molecular weight and the hydroxyl number are selected properly to result in flexible, semi-flexible, semi-rigid or rigid products. The polyol preferably possesses a hydroxyl number of from about 200 to about 1,000 when employed in rigid formulations, from about 50 to about 250 for semi-flexible foams, and from about 20 to 70 or more when employed in flexible foam formulations. Such limits are not intended to be restrictive, but are merely illustrative of the large number of possible combinations of the polyols that can be employed.

Greatly preferred polyether or polyester polyols have a hydroxyl number within a range of from about 100 to about 500, and a molecular weight from about 100 to about 1,000.

Foaming is accomplished by employing in a minor amount (for example, from about 0.5 to 25 weight percent, based on total weight of the reaction mixture), of blowing agents which are vaporized by the exotherm of the isocyanatoreactive hydrogen reaction. The preferred blowing agents are certain halogen-substituted aliphatic hydrocarbons which have boiling points between about $-40°$ C. and $70°$ C., and which vaporize at or below the temperature of the foaming mass. The blowing agents include, for example, trichloromonofluoromethane, dichlorodifluoromethane, dichloromonofluoromethane, chlorodifluoromethane, 1,1-dichloro-1-fluoroethane, chloropentafluoroethane, and others well known to these skilled in the art. Other useful blowing agents are water and low-boiling hydrocarbons such as butane, pentane, hexane, cyclohexane, and the like. Many other compounds easily volatilized by the exotherm of the isocyanato-reactive hydrogen reaction also can be employed. A further class of blowing agents includes the thermally unstable compounds which liberate gases upon heating, such as N,N-dimethyl-N,N'-dinitrosoterephtalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gases are used to provide densities ranging from 30 to 1 pound per cubic foot respectively.

In addition to the above-mentioned salt catalysts an additional isocyanurate group formation catalyst or catalysts to promote trimerization may also be employed as well as conventional polyurethane catalysts. Such catalysts include strong bases, alkali metal salts of carboxylic acids, nonbasic metal salts of carboxylic acids and aliphatic tertiary amines. For example, suitable strong bases include quaternary ammonium hydroxide, alkali metal hydroxide and alkali metal alkoxides. Suitable alkali metal salts of carboxylic acids include, for example, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris (dimethylaminomethyl) phenol, and N,N',N"-tris (dimethylaminopropyl)hexhydro-s-triazine and the like.

The particular amount of catalyst employed can vary over a wide range and is not critical so long as it is present in an amount sufficient to promote trimerization of the isocyanate mixture. Preferably, the catalyst is added in an amount of about 0.0005 to about 0.025 equivalents for each equivalent of isocyanate employed. An optimum amount would be from about 0.001 to about 0.01 equivalents per equivalent of isocyanate. Expressed in other terms, the catalyst is preferably added in an amount of from about 0.03 up to about 5.0 parts by weight, based upon the total foam formulation, i.e., 100 parts by weight.

If desirable, the isocyanurate foams of the invention can be formulated to include flame retardant components to improve the fire retardancy of the foams. Any of the well known fire retardant components compatible with rigid isocyanurate foams can be employed. This would include both the reactive and additive type fire retardants. When employed, the fire retardant component is added to the above-described isocyanate mixture with some other component or as a preformed mixture with some other component described hereinbefore, in an amount of about 1 to about 20 weight percent of the total foam formulation.

Furthermore, fillers can be employed in the preparation of the isocyanurate foams, if desired in amounts within the range of about 0.1 to about 20 weight percent of the total foam formulation. Any conventional filler known in the art to be compatible with isocyanurate foam manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block copolymer of a silane. The latter type of silicone oil is disclosed in U.S. Pat. No. 2,834,748. Other surfactants or emulsifying or dispersing agents which may be used include ethylene oxide modified sorbitan or monopalmitate or ethylene oxide modified polypropylene ether glycol.

The amount of polyol employed in relation to the organic aromatic polyisocyanate is not critical, but preferably ranges in an amount of from about 0.1 to about 0.8 equivalents per equivalent of polyisocyanate. Optimally, about 0.2 to about 0.6 equivalents per equivalent of polyisocyanate is employed. Moreover, the polyol can be added to the polyisocyanate as a separate component or as a preformed mixture with one or more of the other components.

To prepare the isocyanurate foams of the invention, the above discussed ingredients may be simultaneously, or independently intimately mixed with each other by the so-called "one-shot" method to provide a foam by a one-step process. Proportions of ingredients are properly adjusted to give flexible, rigid, semi-flexible or semi-rigid foams. In preparing flexible foams usually water is also employed as part of the blowing agent. In addition to the one-shot method the "quasi prepolymer method" may also be employed. Here, a portion of the polyol is reacted in the absence of a catalyst with the polyisocyanate component. Thereafter to prepare a suitable foam, the remaining portion of the polyol is added and reaction allowed to go to completion in the presence of catalyst along with other appropriate additives such as blowing agents, foam stabilizing agents, fire retardants, etc.

Again, the isocyanurate foams of the present invention may be prepared over a wide range of temperatures. However, normally the reaction is initiated at room temperature, and the only heat involved is that generated by the polymerization itself.

The invention will be illustrated further with respect to the following specific examples, which are given by way of illustration and not as limitations on the scope of this invention.

EXAMPLE 13

The product prepared according to Example 9 was used as a catalyst for the preparation of an iscyanurate foam. The foams were prepared as follows: a premixed B component (Table I, amounts in grams) was combined with polyisocyanate using a high speed stirrer. The mixture was poured into a mold and allowed to rise. Physical properties were determined after a week's storage at ambient temperature.

A 50% solution of the catalyst potassium octoate (manufactured by M&T Chemicals Company, Inc.) in a glycerinepropylene oxide adduct (molecular weight about 700) was used for comparison (Table I, Run 5). The runs show that the catalyst of our invention provided a desirable longer cream time than potassium octoate with essentially unchanged rise and tack free times. Columns 3 and 4 also show that the silicon surfactant may be omitted in the B component.

TABLE I

| B-Component Formulation | | | | | |
|---|---|---|---|---|---|
| RUN | 1 | 2 | 3 | 4 | 6 |
| Novolak based polyol[1] | 165.8 | 154 | 163.8 | 152.1 | 154.8 |
| Silicone surfactant[2] | 3.3 | 3.3 | — | — | 3.3 |
| $CCl_3F$ blowing agent | 72 | 72 | 72 | 72 | 72 |
| Tris (beta-chloroethyl) Phosphate[3] | — | 39 | — | 39 | — |
| Catalyst from Exp. 9 | 19.5 | 19.5 | 26 | 26 | — |
| 50% potassium octoate solution (M&T Chemical) | — | — | — | — | 9.7 |
| B-Component | 246 | 271 | 250.2 | 275.4 | 241.8 |
| Isocyanate[4] | 354 | 328.4 | 349.8 | 324.6 | 258.2 |
| Cream time, Sec. | 11 | 11 | 10 | 6 | 4 |
| Tack free time, Sec. | 25 | 25 | 25 | 15 | 25 |
| Rise time, Sec. | 30 | 30 | 35 | 25 | 25 |
| Density (pcf) | 2.39 | 2.41 | 2.40 | 2.43 | 2.41 |
| K-factor | 0.133 | 0.137 | 0.135 | 0.133 | 0.133 |
| Compressive strength | | | | | |
| with rise (psi) | 47.54 | 46.64 | 29.32 | 30.14 | 41.54 |
| across rise (psi) | 13.43 | 10.86 | 13.33 | 9.98 | 18.63 |
| Heat distortion °C. | 193 | 180 | 193 | 162 | 203 |
| % closed cells | 92.3 | 91.4 | 91.8 | 91.3 | 91.9 |
| Friability - % wt. loss | 24.3 | 26.1 | 33.8 | 28.0 | 32.8 |
| Butler Chimney Test[5] | | | | | |
| % wt. retained | 90.1 | 92.4 | 93.3 | 96.1 | 91.9 |
| seconds to extinguish | 10 | <10 | 9.2 | <10 | 10.5 |
| Flame height-inches | 7.8 | 3.8 | 7.5 | 3.3 | 7.9 |
| Dimensional stability | | | | | |
| 158° F./100% Rel. humidity, | | | | | |
| Δ Vol. % | +6.5 | +8.7 | +9.1 | +10.9 | +5.2 |
| Δ Weight % | −2.1 | −2.4 | −4.5 | −.57 | −1.8 |
| Δ Linear | +4.3 | +5.8 | +6.0 | +8.3 | +3.1 |
| 200° F./Dry | | | | | |
| Δ Vol. % | +3.0 | +5.1 | +5.5 | +12.1 | +3.5 |
| Δ Weight % | +2.2 | −4.0 | −2.8 | −8.3 | +1.0 |
| Δ Linear % | +1.8 | +4.4 | +4.1 | +8.8 | +2.7 |
| −20° F./Dry | | | | | |
| ΔVol. % | −0.7 | −4.0 | −6.0 | −11.1 | −4.9 |
| Δ Weight % | +0.6 | +0.5 | +0.3 | +0.4 | +0.1 |
| Δ Linear | −4.1 | −3.0 | −4.1 | −6.0 | −3.6 |

Notes:
[1]OH #194, functionality - 2.4
[2]DC-193 from Dow Corning
[3]Fyrol CEF Stauffer Chemical Co.
[4]methylene bridged polyphenylisocyanate mixture, NCO equivalent = 133, functionality 2.7
[5]ASTM #D-3014-73. Numerical or other data from this test are not intended to reflect hazards presented by this or any other material under actual fire conditions. The data represent the behavior of the tested material under specific controlled test conditions.

EXAMPLE 14

Isocyanurate foam was made with the sodium salt of the product of Example 10 to demonstrate that the sodium salt of the compounds of the invention are suitable catalyst, in the same manner as in Example 13. The formulation and profile are as follows on Table II. Amounts are parts of weight.

TABLE II

| | RUN 6 | RUN 7 |
|---|---|---|
| Novolak polyol | 25.2 | 24.6 |
| DC-193 | 0.5 | 0.5 |
| $CCl_3F$ | 12 | 12 |
| Catalyst | 4 | 6 |
| THANATE® P-270 | 58.3 | 56.9 |
| | Seconds | Seconds |
| Cream time | 19 | 14 |
| Tack-free time | 72 | 52 |
| Rise time | 75 | 55 |

EXAMPLE 15

To further illustrate this invention and to compare same with existing polyisocyanurate catalyst a compound of this invention was prepared as described in Example 5 by mixing and reacting itaconic acid with the ammoniated two mole propylene oxide adduct of a mixture of $C_{10}$–$C_{14}$ alcohols (Epal 10–14, Ethyl Corporation) and converted into the potassium salt as described. The catalysts thus produced are discovered to have a delayed cream time and good foam properties, thus being particularly suitable in the production of polyisocyanurate foam panels. Other catalysts will produce similar delayed effects but the foam quality has been found to be unacceptable.

To make the comparison three polyols were used: an anilineethylene oxide adduct (Table III); diethylene glycol (Table IV) and a trimethylolpropane-ethylene oxide adduct (Table V). The catalyst of Example 15 was compared with DABCO TMR and TMR II (tetramethylammoniumoctoate from Houdry; T-45 (50% potassium octoate in a glycol) from M&T Chemicals; DMP-30 (2,4,6-tris[dimethylaminomethyl]phenol); Polycat 41 (N,N′,N″-tris[dimethylaminopropyl]-s-hexadroariazine); Curithane C-51 (reaction product of potassium octoate and phenyl isocyanate) and Curthane C-52 (sodium N-(2-hydroxyl-5 nonylphenol) methyl-N-methyl glycinate).

No difference was observed between DABCO TMR and DABCO TMR II catalyzed foams. Reactions profiles similar to the Example 15 catalyst profiles could be obtained, but these foams from prior art catalyst were soft and resilient at the cure stage and eventually shrank. The amount of shrinkage depended on the system used. The also suffer from a very rapid secondary rise. While the catalyst of this invention also has a secondary rise it is not nearly as severe and gives a firm cure. This improved green strength would offer a decided advantage over prior art catalysts in a continuous panel line. The catalyst of this invention possesses surfactant properties, thus less surfactant can be used.

TABLE III

| ANILINE-ETHYLENE OXIDE ADDUCT | | | | | | | | | | | Curithane | |
|---|---|---|---|---|---|---|---|---|---|---|---|---|
| | Ex. 15 | DABCO TMR | | DABCO TMR II | | M&T's T-45 | Polycat 41 | | DMP-30 | | C-51 | C-52 |
| Formulation | | | | | | | | | | | | |
| Polyol | 16 | 16 | 16 | 16 | 16 | 16 | 16 | 16 | 16 | 16 | 16 | 16 | 16 | 16 |
| DC-193 | 0.5 | 0.5 | 0.5 | 0.5 | 0.5 | 0.5 | 0.5 | 0.5 | 0.5 | 0.5 | 0.5 | 0.5 | 0.5 | 0.5 |
| $CCl_3F$ | 13 | 13 | 13 | 13 | 13 | 13 | 13 | 13 | 13 | 13 | 13 | 13 | 13 | 13 |
| Isocyanate* | 62.4 | 63.4 | 64.1 | 64.0 | 64.1 | 64.0 | 64.1 | 64.0 | 62.5 | 61.5 | 60.5 | 63.5 | 63 | 56.5 | 55.5 |
| Catalyst | 1.25 | 1.8 | 0.4 | 0.5 | 0.4 | 0.5 | 0.4 | 0.5 | 2.0 | 3.0 | 4.0 | 1.0 | 1.5 | 8.0 | 9.0 |
| Reaction Profile | | | | | | | | | | | | | | | |
| Cream time, sec | 8 | 6 | 10 | 6 | 8 | 6 | 6 | 5 | 2 | 2 | 3 | 6 | 5 | 7 | 6 |
| Tack free time, sec | 50 | 23 | 60 | 32 | 60 | 34 | 55 | 35 | 75 | 45 | 195 | 50 | 22 | 55 | 40 |
| Rise time, sec | 60 | 50 | 80 | 57 | 80 | 54 | 78 | 55 | 75 | 60 | — | 60 | 45 | 75 | 70 |

TABLE III-continued
ANILINE-ETHYLENE OXIDE ADDUCT

|  | Ex. 15 | DABCO TMR | DABCO TMR II | M&T's T-45 | Polycat 41 | DMP-30 | Curithane C-51 | | C-52 | |
|---|---|---|---|---|---|---|---|---|---|---|
| Comments | 1 | 1 | 3 | 3,4 | 3 | 3 | 2 | 2 | 5 | 1 | 3 | 2,4 | 1 | 4 | 4 |

1 Good Foam
2 Very Slight Shrinkage
3 Shrank
4 Poor Green Strength
5 Surface Very Friable
*polymethylenepolyphenylisocyante; Eq. wt. 134, functionality - 2.7

TABLE IV
DIETHYLENE GLYCOL

|  | Ex. 15 | | DABCO TMR | | DABCO TMR II | | M&T's T-45 | | Polycat 41 | DMP-30 | Curithane | | | |
|---|---|---|---|---|---|---|---|---|---|---|---|---|---|---|
|  |  |  |  |  |  |  |  |  |  |  | C-51 | | C-52 | |
| Formulation |  |  |  |  |  |  |  |  |  |  |  |  |  |  |
| Polyol | 9.9 | 9.8 | 9.9 | 9.8 | 9.9 | 9.8 | 9.9 | 9.8 | 9.9 | 9.9 | 9.9 | 9.8 | 9.9 | 9.8 |
| DC-193 | 1.5 | 1.5 | 1.5 | 1.5 | 1.5 | 1.5 | 1.5 | 1.5 | 1.5 | 1.5 | 1.5 | 1.5 | 1.5 | 1.5 |
| CCl$_3$F | 12.5 | 12.5 | 12.5 | 12.5 | 12.5 | 12.5 | 12.5 | 12.5 | 12.5 | 12.5 | 12.5 | 12.5 | 12.5 | 12.5 |
| Isocyante* | 75.2 | 74.9 | 75.2 | 74.6 | 75.2 | 74.8 | 75.8 | 74.9 | 75.1 | 75.1 | 75.3 | 75.3 | 75 | 74.8 |
| Catalyst | 1.0 | 1.8 | 1.0 | 1.8 | 1.0 | 1.8 | 1.0 | 1.8 | 1.0 | 1.0 | 1.0 | 1.8 | 1.0 | 1.8 |
| Reaction Profile |  |  |  |  |  |  |  |  |  |  |  |  |  |  |
| Cream time, sec | 31 | 22 | 25 | 14 | 23 | 12 | 15 | 10 | 4 | 6 | 30 | 16 | 45 | 26 |
| Tack free time, sec | 60 | 58 | 45 | 26 | 46 | 23 | 35 | 19 | 25 | — | — | 45 | — | 130 |
| Rise time, sec | 80 | 80 | 65 | 45 | 65 | 45 | 50 | 35 | 35 | 50 | 110 | 60 | 220 | 100 |
| Comments | 2 | 1 | 6 | 7,6,8 | 6 | 7,6,8 | 2 | 2 | Too Fast | 9 | 9 | 3 | 9 | 3 |

6 Very Lumpy Bad Surface
7 Very Rapid Secondary Rise
8 Large Open Cells On Surface
9 Did Not Cure
*Polymethylenepolyphenylisocyanate; Eq. wt. 134, functionality - 2.7

TABLE V
TRIMETHYLOLPROPANE-ETHYLENE OXIDE ADDUCT

|  | Ex. 15 | DABCO TMR | | DABCO TMR II | M&T's T-45 | | Polycat 41 | | DMP-30 | | C-51 | | C-52 | |
|---|---|---|---|---|---|---|---|---|---|---|---|---|---|---|
| Formulation |  |  |  |  |  |  |  |  |  |  |  |  |  |  |
| Polyol | 9.7 | 9.8 | 9.7 | 9.8 | 9.7 | 9.8 | 9.7 | 9.8 | 9.8 | 9.7 | 9.8 | 9.7 | 9.8 | 9.7 |
| DC-193 | 1.5 | 1.5 | 1.5 | 1.5 | 1.5 | 1.5 | 1.5 | 1.5 | 1.5 | 1.5 | 1.5 | 1.5 | 1.5 | 1.5 |
| CCl$_3$F | 12.5 | 12.5 | 12.5 | 12.5 | 12.5 | 12.5 | 12.5 | 12.5 | 12.5 | 12.5 | 12.5 | 12.5 | 12.5 | 12.5 |
| Isocyanate* | 74.3 | 75.1 | 75.1 | 75.2 | 74.5 | 74.1 | 74.8 | 74.7 | 74.9 | 74.8 | 75.1 | 74.8 | 75.2 | 75 |
| Catalyst | 1.8 | 1.0 | 1.8 | 1.0 | 1.8 | 1.0 | 1.8 | 1.0 | 1.0 | 1.8 | 1.0 | 1.8 | 1.0 | 1.8 |
| Reaction Profile |  |  |  |  |  |  |  |  |  |  |  |  |  |  |
| Cream time, sec | 14 | 12 | 9 | 12 | 9 | 10 | 5 | 5 | 8 | 5 | 19 | 12 | 45 | 35 |
| Tack free time, sec | 34 | 30 | 16 | 29 | 15 | 30 | 19 | 90 | — | — | — | 45 | — | — |
| Rise time, sec | 60 | 60 | 45 | 55 | 42 | 48 | 45 | 85 | — | 120 | 80 | 60 | 240 | 150 |
| Comments | 1 | 2,10 | 1,7 | 2,10 | 1,7 | 2 | 1 | 5 | 9 | 9 | 9,3 | 11 | 9 | 9 |

10 Soft Cure
11 Under Catalyzed
*polymethylenepolyphenylisocyanate; Eq. Wt. 134, functionality - 2.7

From the foregoing, it can be readily seen that the novel compounds of this invention are extremely useful as surface active agents, particularly in the form of the Group 1a and 2a metal salts thereof which exhibit strong hydrophilicity. As has been demonstrated in preferred useful embodiments of the invention novel detergent compositions and particularly useful polyisocyanurate catalyst compositions leading to useful foam panels have been discovered. Other uses and advantages of the compounds of this invention, as well as variations of the embodiments specifically described, will be apparent to those skilled in the art from the foregoing description without departing from the scope of the invention.

We claim:

1. A detergent composition comprising from about 15 wt.% to about 30 wt.% of a surface active agent and, correspondingly, from about 70 wt.% to about 85 wt.% of detergent builders, such detergent being dissolved in water, wherein the surface active agent comprises at least a surface active amount of compounds represented by the formula:

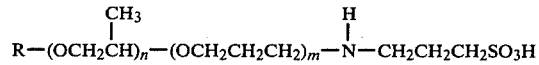

where R is an alkyl group having from 6 to about 18 carbon atoms and n has an average value from 0 to about 20 and m is 0 or 1 provided m is 1 when n is 0.

2. A detergent composition as in claim 1 wherein the surface active agent comprises the Group 1a or 2a metal salts of the compounds depicted by formula in claim 1.

3. A detergent composition comprising from about 15 wt.% to about 30 wt.% of a surface active agent and, correspondingly, from about 70 wt.% to about 85 wt.% of detergent builders, such detergent being dissolved in water, wherein the surface active agent comprises at least a surface active amount of compounds represented by the formula:
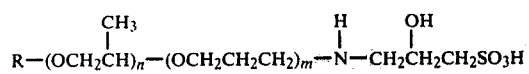
where R is an alkyl group having from 6 to about 18 carbon atoms and n has an average value from 0 to about 20 and m is 0 or 1 provided m is 1 when n is 0.
4. A detergent composition as in claim 3 wherein the surface active agent comprises the Group 1a or 2a metal salts of the compounds depicted by formula in claim 3.
* * * * *